United States Patent [19]
Törnqvist

[11] Patent Number: 5,722,341
[45] Date of Patent: Mar. 3, 1998

[54] HULL-RELATED ARRANGEMENT

[76] Inventor: Bengt Wilhelm Törnqvist, 105 East 63rd St., #8B, New York, N.Y. 10021

[21] Appl. No.: 737,748
[22] PCT Filed: May 29, 1995
[86] PCT No.: PCT/SE95/00605
§ 371 Date: Nov. 21, 1996
§ 102(e) Date: Nov. 21, 1996
[87] PCT Pub. No.: WO95/32888
PCT Pub. Date: Dec. 7, 1995

[30] Foreign Application Priority Data

May 30, 1994 [SE] Sweden ............... 94 01852-0

[51] Int. Cl.⁶ .................................................. B63B 35/42
[52] U.S. Cl. ................................. 114/260; 114/67 A
[58] Field of Search ............................ 114/259, 260, 114/67 A

[56] References Cited

U.S. PATENT DOCUMENTS

| | | | |
|---|---|---|---|
| Re. 30,040 | 7/1979 | Kirby et al. | 114/260 |
| 955,214 | 4/1910 | Schroeder | 114/67 A |
| 1,107,741 | 8/1914 | Ballin et al. | 114/260 |
| 1,803,104 | 4/1931 | Fletcher | 114/260 |
| 2,138,831 | 12/1938 | Brammer | 114/67 A |
| 2,218,938 | 10/1940 | Rinne | 114/67 A |
| 2,988,035 | 6/1961 | Gram | 114/67 A |
| 3,595,191 | 7/1971 | Grundy | 114/67 A |
| 3,823,681 | 7/1974 | Cushing et al. | |
| 3,934,530 | 1/1976 | Kossa et al. | 114/260 |
| 5,146,863 | 9/1992 | Ford | 114/67 A |

FOREIGN PATENT DOCUMENTS

| | | | |
|---|---|---|---|
| 18691 | 2/1977 | Japan | 114/67 A |
| 47690 | 3/1983 | Japan | 114/67 A |
| 164294 | 9/1984 | Japan | 114/67 A |
| 343 500 | 2/1973 | Sweden . | |
| 426465 | 1/1983 | Sweden . | |
| 436186 | 11/1984 | Sweden . | |
| 447891 | 12/1986 | Sweden . | |
| 2 075 432 | 11/1981 | United Kingdom . | |
| 2 103 155 | 2/1983 | United Kingdom . | |

OTHER PUBLICATIONS

Patent Abstract of Japan, JP 58-47690 (A), vol. 7, No. 128, M-220, "Method of Reducing Frictional Resistance of Ship and Its Device", Kazu Tanabe, 19 Mar. 1983.

*Primary Examiner*—Sherman Basinger
*Attorney, Agent, or Firm*—Burns, Doane, Swecker & Mathis, L.L.P.

[57] ABSTRACT

A ship's hull has a cargo deck which is located adjacent a waterline and which is intended to carry a number of barges. The cargo deck is open toward the stern of the vessel. An interior of the hull accommodates one or more ballast tanks and a device for emptying and filling the ballast tanks with water, either completely or partially, thereby enabling the hull to be brought to a shallow draft waterline or to a deeper draft waterline. An air-compressing device generates an air flow which can be delivered to the outer surfaces of the hull by a pipe system which discharges beneath the waterline. At least a part of the lowermost surface region of the hull is flat and extends horizontally. Arranged within this region is a downwardly open cavity of small height and large surface extension. The pipe system discharges at least into the cavity. Air bubbles that are generated will also reduce friction against side-related hull surfaces, even when the hull heels steeply in heavy swells.

4 Claims, 2 Drawing Sheets

HULL-RELATED ARRANGEMENT

TECHNICAL FIELD

The present invention relates to the hulls of seagoing vessels and more particularly, but not exclusively, to hulls of very large dimensions. Vessels or ships, equipped with such hulls are referred to generally as "Jumbo Barge Carriers" (JBC).

The hulls of cargo-carrying vessels adapted for displacement speeds, for instance to eliminate planing, will have a length of from 400 to 450 m and a width of from 70 to 80 m.

The invention relates even more particularly to a hull construction which is designed for forward displacement speeds and which includes a barge-carrying cargo deck located adjacent a waterline and a control space, etc., which is located in the foredeck as seen in the normal movement direction of the vessel, wherein the cargo deck has extending along the port and starboard sides thereof side members or wall members and/or a centrally located central member or wall member and is open towards the stern of the vessel, wherein the hull interior encloses one or more ballast tanks, and the means required to empty or fill the ballast tanks either completely or partially, with water, thereby to ensure that a relevant hull waterline can be chosen for shallow draft conditions by emptying the ballast tanks with the aid of said means, or for deeper draft conditions, by filling the ballast tanks with the aid of said means, wherein when the ballast tanks are full the cargo deck will be located so far beneath a waterline that fully loaded barges are able to float across the cargo deck, whereas when the ballast tanks are empty the cargo deck will be located at a height at which the weight of the barges will be taken-up either totally or partially by the cargo deck, and wherein there is provided an air compressing device which is adapted to generate an air flow that can be delivered through a pipe system to the outer surface of the hull and which discharges beneath the waterline.

In order to enable the invention to be applied in practice, there is required a special, although previously known, hull design which in cross-section, at least beneath the waterline, has a flat bottom-associated surface and side members which are upstanding from the port and starboard edges of said surface and which diverge away from said bottom-associated flat surface.

DESCRIPTION OF THE PRIOR ART

Cargo vessels equipped with hull designs of the aforesaid kind are known to the art.

As an example of the earlier state of the art, from which the present invention can be said to depart, reference is made to the hull design shown and described in Swedish Patent Specification 426 465 (Patent Application 80 03444-0).

With regard to the singularities associated with the present invention, it can be mentioned that it is known from Swedish Patent Specification 353 500 in the case of ice-breakers to eject air through tubular openings in the hull and to use, to this end, nozzles that are mounted beneath the waterline at a distance corresponding to 30 to 50% of the ship's draft, so that with the aid of large volumes of air the surface of the water can be raised to a significant height in the form of a ridge adjacent the hull waterline, so that water will flow away from the ship's sides and therewith move ice-floes and the like away therefrom.

Swedish Patent Specification 447 891 teaches a method of reducing the frictional resistance of an object moving in a fluid, by blowing a stream of gas along that side of the object which is in contact with the fluid. According to this specification, the fluid-contacting side is coated with or comprised of a gas permeable material which generates a low pressure drop in the gas as it passes through the material. It is stated that microbubbles can be formed adjacent said fluid contacting side so as to improve the technical effect, by applying pressure surges.

It is earlier known from Swedish Patent Specification 436 186 to design a ship's hull in which the bottom of the hull is provided with a plurality of downwardly open channels which are intended to receive air as the ship moves forwards and therewith reduce the friction between the surface of the water and the surface of the hull bottom. The hull, in this case, is constructed for planing forward speeds.

U.S. Patent Publication U.S. Pat. No. 5,146,863, UK Patent Publication 2 103 155 and Japanese Patent Publication JP 58-47690 describe a method of generating a displacement vessel propelling force by placing within a flat surface belonging to the hull bottom a cavity that can be filled with air or to which air can be delivered in some other way, for instance through nozzle-equipped conduits, so as to generate a friction reducing air layer.

This latter concept can be considered to lie close to the present invention, insomuch that it includes the possibility of mounting nozzle-equipped pipes beneath the flat surface of a hull bottom and to pass through these nozzles air streams that can rise along vertical side surfaces and therewith lower the friction beneath the bottom-related flat surface and along the mutually parallel surfaces upstanding from said flat surface.

DISCLOSURE OF THE PRESENT INVENTION

TECHNICAL PROBLEMS

When considering the present state of the art, as described above, it will be seen that a technical problem resides in realizing that in the case of large hull constructions of the aforedescribed kind, a ballast tank function can be placed externally of and centred beneath the hull, at the same time as a supportive water surface beneath the hull can rest on an air cushion and therewith generate a lower frictional resistance to the water surface than the actual hull, and also to realize that the frictional resistance can be further reduced when the air delivered is able to rise upwards along upwardly diverging side surfaces located beneath the waterline, so that the air bubbles generated will rise along said surfaces even when the hull rolls as it moves through the water.

It will also be seen that a technical problem resides in realizing the significance of primarily using this ballast tank function to raise and lower the hull in the water as the vessel moves therethrough, so as to be able to stabilize the vessel in prevailing weather conditions, for instance a low, more stable attitude in heavy seas with accepted greater frictional resistance, and a high attitude in quieter waters with smaller frictional resistance.

It will also be seen that in the case of a hull construction that include a cargo deck located adjacent a waterline and intended to carry a number of barges, and a control space, etc., located conveniently on the forward part of the vessel as seen in the normal direction of ship movement, and in which the cargo deck includes along the port and starboard sides thereof wall members and/or a centrally located wall member and is open towards the stern, and in which the hull interior encloses one or more ballast tanks and means for emptying or filling the ballast tanks with water, either completely or partially, therewith to enable the hull waterline to be adjusted to a shallow draft, by emptying the ballast tanks with the aid of said means, or a deeper draft, by filling the ballast tanks with the aid of said means, and in which when the ballast tanks are filled the cargo deck will be located so far beneath a waterline as to enable loaded barges to float above the cargo deck, while when the ballast tanks are empty the cargo deck will be located at such a high level above the waterline that the weight of the barges will act on the cargo deck, either completely or partially, and in which there is included an air compressing means adapted to generate an air flow which can be delivered to the outer surface of the hull through a pipe system which discharge beneath the waterline, it will be seen that a further technical problem is one of realizing the advantages that are afforded when at least a part of the lowermost surface region of the hull is flat and extends horizontally, by providing within this lowermost surface region a downwardly fully open air-enclosing cavity of small height and large extension, and by causing the pipe system to at least discharge into the cavity, and also to realize the significance of permitting the air delivered to rise upwards along upwardly diverging hull sides so as to reduce the friction against said sides even when the vessel yaws and heels in heavy swell.

Another technical problem is one of realizing the significance of allowing the cavity to cover at least 20% of the wet surface of the hull, although normally less than 40% of said surface.

In the case of an earlier known hull structure (SE-A-426 465) having a flat bottom part, a further technical problem is one of realizing the significance of providing a cavity whose width is only slightly smaller than the width of the flat bottom part and to give the cavity a length such that said cavity will cover 40–80% of the bottom surface of the hull (not the side parts), preferably 50–70% of said bottom surface.

Another technical problem resides in realizing that the cavity shall be placed between the foreward part of the hull and extend towards the stern, preferably towards the region of the engine room and the like.

Another technical problem is one of realizing the significance of allowing the pipe system to discharge through the lowermost part of the hull and is lateral of the cavity.

Another technical problem is one of realizing the consequences associated with allowing the pipe system to discharge on both the port and the starboard sides, and of allowing the discharge orifices and/or associated nozzles of the pipe system to be disposed in a mutual horizontal spaced relationship greater than 10 cm. It is particularly proposed that the orifices and/or nozzles are spaced apart at a distance of between 25 and 50 cm, normally between 30 and 40 cm. It is thought that spacings greater than 100 cm would be rare.

Another technical problem is one of realizing the significance of permitting the distance between the nozzles to be smaller within the bow parts of the hull than within the midship parts thereof.

A constructive technical problem resides in permitting a number of nozzle-acting channels to be disposed along the side-edge regions of the cavity, and to cause the channels to discharge in the lowermost region, or in the immediate proximity of a lowermost region of the two side members of the hull, said members having a form and slope which diverges upwardly from a vertical plane.

Another technical problem resides in realizing that the hull shall have in cross-section along the whole of its length a centred, horizontally extending bottom part having two side members which extend from hull-length orientated edge lines of the bottom part and from two side members which diverge upwardly from a vertical plane, such as to provide a hull design which will provide the advantages offered by the invention.

SOLUTION

With the intention of solving one or more of the aforesaid technical problems, the present invention takes as its starting point a hull construction which includes a barge-carrying cargo deck located adjacent a waterline and a control space, etc., which is located in the foredeck as seen in the normal movement direction of the vessel, wherein the cargo deck has extending along the port and starboard sides thereof side members or wall members and/or a centrally located central member or wall member and is open towards the stern of the vessel, wherein the hull interior encloses one or more ballast tanks, and the means required to empty or fill the ballast tanks either completely or partially, with water, thereby to ensure that a relevant hull waterline can be chosen for shallow draft conditions by emptying the ballast tanks with the aid of said means, or for deeper draft conditions, by filling the ballast tanks with the aid of said means, wherein when the ballast tanks are full the cargo deck will be located so far beneath a waterline that fully loaded barges are able to float across the cargo deck, whereas when the ballast tanks are empty the cargo deck will be located at a height at which the weight of the barges will be taken-up either totally or partially by the cargo deck, and wherein there is provided an air compressing device which is adapted to generate an air flow that can be delivered through a pipe system to the outer surface of the hull and which discharges beneath the waterline.

In the case of a hull of this construction, the present invention is based on the realization that at least a part of the lowermost surface region of the hull shall be flat and extend horizontally, and that there is provided within this region a downwardly fully open and air-enclosing cavity which has a large extension and a small height, and that the pipe system discharges at least into the cavity.

In accordance with the present invention, upwardly diverging side-related surface regions of the hull which can be brought at least partially beneath the waterline and which are positioned adjacent the flat, horizontally extending surface region are caused to generate lower frictional forces with contiguous water masses, by causing air bubbles to rise along said surface regions even in the case of hull movements deriving from heavy swells and rough water.

According to preferred embodiments lying within the scope of the inventive concept, the cavity covers from 40–80% of the forwardly located, lowermost and flat surface extension of the hull.

Preferably, the cavity will have a height of from 0.5–1.5 m.

According to one embodiment, the pipe system is arranged so that the discharge orifices thereof open out within the lowermost part of the hull and laterally of the cavity.

It is preferred that the pipe system discharges on both the port and the starboard sides, and that the discharge orifices and/or the nozzles of the pipe system are spaced horizontally apart, with the spacing between respective orifices and/or nozzles being greater than 10 cm and smaller than 100 cm.

There is nothing to prevent the distance between respective nozzles within the bow part of the hull to be shorter than the distance along the midship's part of the hull.

Preferably, nozzle-acting channels are disposed at least along the side-edge regions of the cavity, these channels being arranged to discharge at the lowermost part, or in the immediate vicinity of the lowermost part of the hull side members that diverge upwardly from a vertical plane.

The invention proposes the use of a hull which is earlier known in principle and whose cross-sectional shape includes along essentially the whole of the length of the hull a horizontally extending and centred lowermost bottom part having two side members which extend from the bottom edge lines of said bottom part and diverge upwardly from a vertical plane.

ADVANTAGES

Those advantages that are primarily afforded by a hull constructed in accordance with the present invention reside in the provision of conditions for reducing the frictional resistance between a hull adapted for displacement speeds and the water layers in contact with the hull and generated by surrounding water masses, wherewith a greater speed or a reduced fuel consumption at a given speed is to be expected, particularly in the case of hulls adapted as "Jumbo Barge Carriers". The hull is also provided with a downwardly open cavity which functions as a ballast tank.

The primary characteristic features of an inventive hull set forth in the characterizing clause of the following claim 1.

BRIEF DESCRIPTION OF THE DRAWINGS

An exemplifying embodiment of the invention at present preferred and exhibiting characteristic features of the invention will now be described with reference to the accompanying drawings, in which.

DESCRIPTION OF AN EMBODIMENT AT PRESENT PREFERRED

Figure 1:
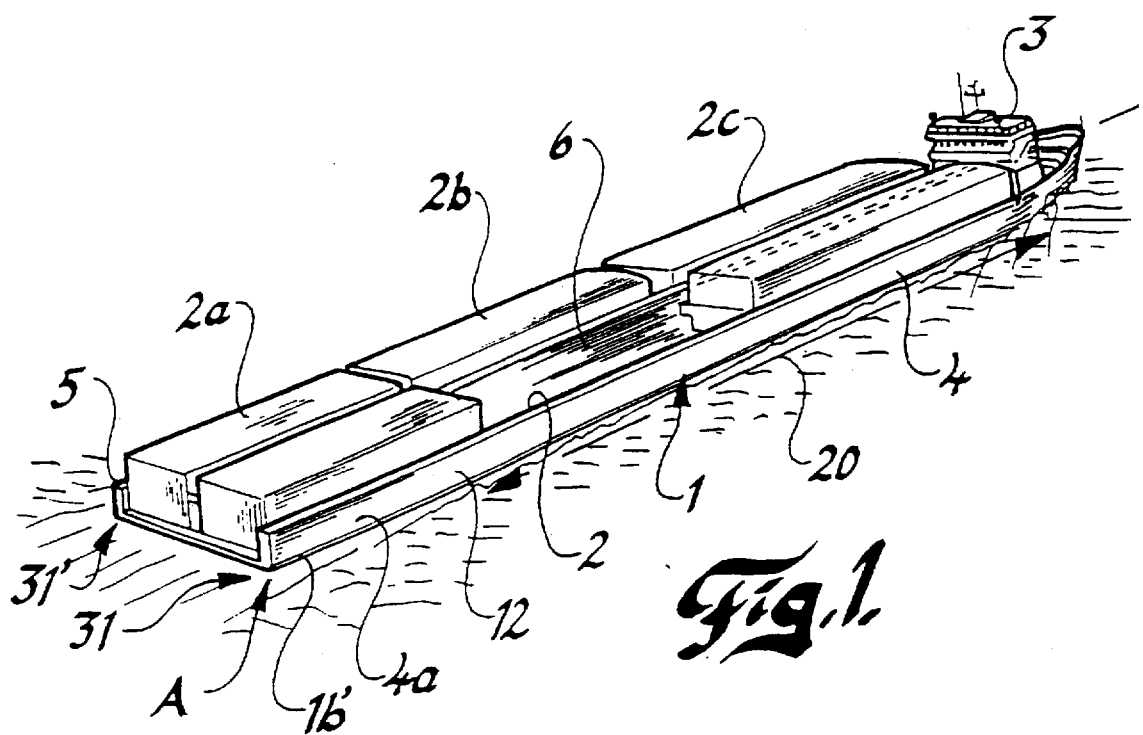
FIG. 1 is a perspective view of a partially loaded vessel equipped with a hull constructed in accordance with the principles of the invention.
Figure 2:
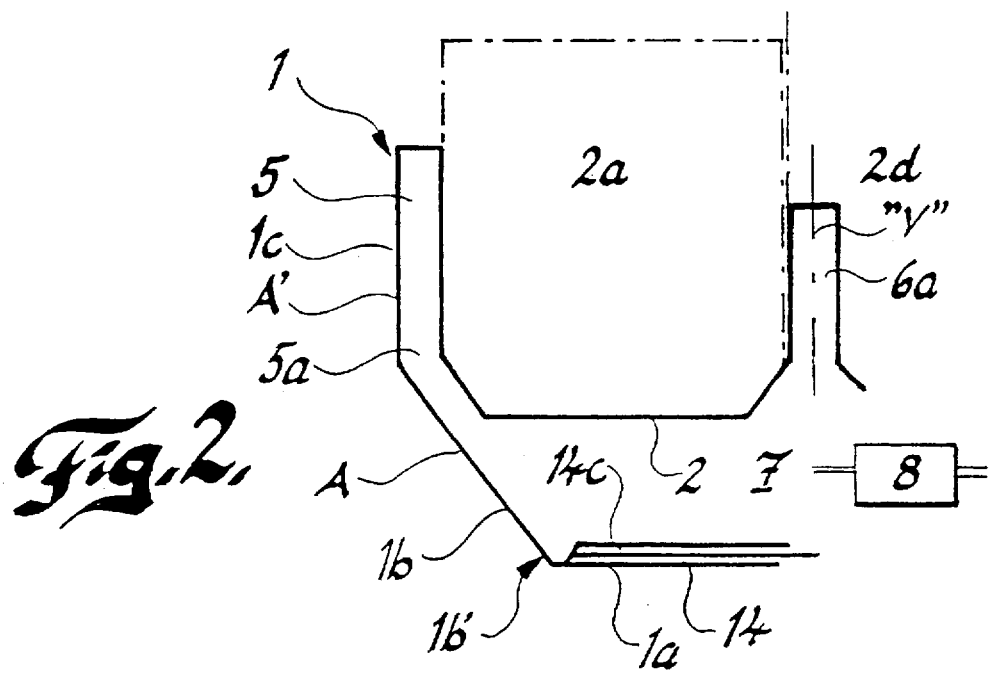
FIG. 2 is a schematic cross-sectional view of half the vessel shown in FIG. 1.

The present invention relates to a vessel hull 1 which includes adjacent a waterline "A" a cargo deck 2 which is adapted to carry a number of barges. In the illustrated embodiment, six barge sites are loaded with five barges referenced 2a–2f, while one barge site has been left empty for purposes of illustration. Naturally, all barge sites will be occupied when the vessel is fully loaded.

Located on the forward part of the hull 1, as seen in the direction "P" in which the vessel is propelled, is a control space 3, etc., and the cargo deck has side members or wall members 4, 5 and/or a centrally located wall member 6 which extend along the port side and the starboard side of the vessel, said cargo deck 2 being open towards the stern of the vessel. Mounted in the interior of the hull 1 in a lower part thereof are one or more ballast tanks 7. These ballast tanks will not be described and shown in detail.

As shown, the side members 4 and 5 and the centrally located wall member 6 form ballast tanks 5a, 4a and 6a.

As will be understood, the hull also includes means 8 required to empty or to fill the ballast tanks, with water, either completely or partially, thereby ensuring that the hull waterline "A" can be adjusted to a shallow draft, by emptying the ballast tanks with the aid of said means 8, or to a deeper draft (down to the waterline "A'") by filling the ballast tanks with water with the aid of said means 8.

It should be observed that the hull design and the volume of the ballast tanks will mutually be so adapted with regard to size and position that when the ballast tanks are full, the cargo deck 2 will be located so far beneath a relevant waterline that the mutually connected barges, such as the barges 2a, 2b and 2c, can be towed or pushed by a tugboat while floating above the cargo deck 2, whereas when the ballast tanks are empty the cargo deck will be located so far above the waterline that the weight of the barges 2a, 2b and 2c will rest against the cargo deck 2, either completely or partially.

Figure 3:
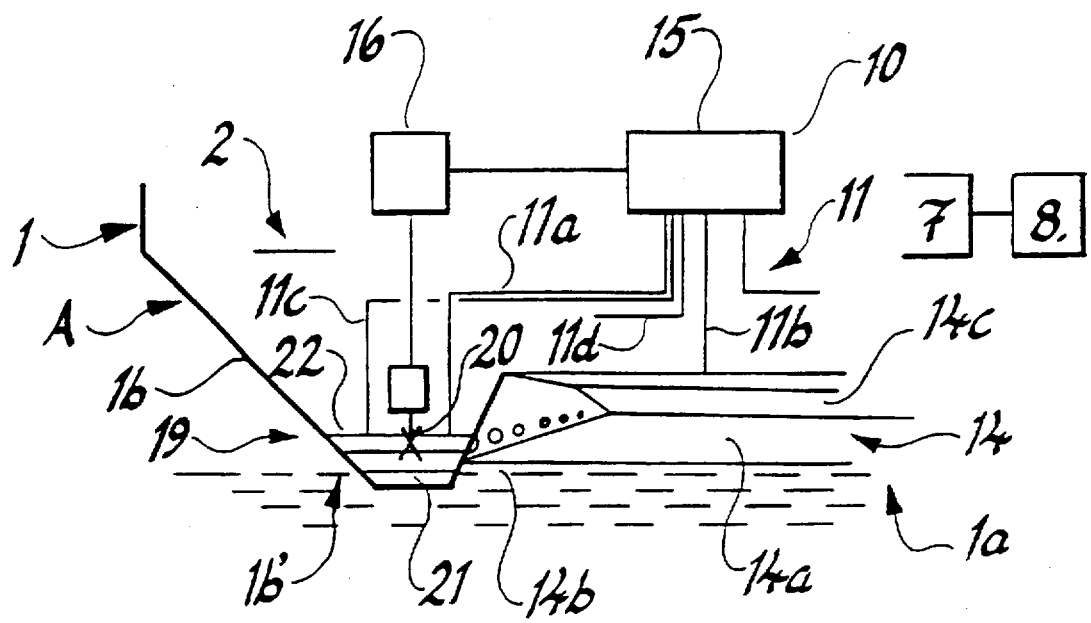
FIG. 3 is an enlarged perspective view of a portion of bottom part shown in FIG. 2.

The invention requires the use of an air-compressing device 10, shown schematically in FIG. 3, which is constructed and dimensioned to generate an air volume and an air flow which can be delivered to the outer surface of the hull through a pipe system 11 which includes a pipe 11a and discharges beneath said waterline.

At least a part of the lowermost surface region 1a of the hull, more particularly the surface region that extends between the forecastle 3 and the engine room 12 and referenced 20 in FIG. 1, is flat and extends horizontally. Formed within the surface area 20 is a downwardly open, air-enclosing cavity 14 which has a wide extension and a small height. The aforesaid pipe system 11 discharges at least directly into the cavity 14 through a pipe 11.

In the illustrated case, the horizontal extension of the cavity 14 covers 55 to 65% of the lowermost surface extension of the hull, including the horizontal part 1a.

The cavity 14 includes transversely extending, upwardly sloping and mutually convergent surfaces at its foreward and sternward ends, where one surface is referenced 14C, to delimit the edge region of the cavity.

The cavity 14 is able to function as a ballast tank and can be filled with water and emptied thereof, by commensurate adjustment to the overlying air volume. The enclosed air volume is referenced 14a in FIG. 3, while the enclosed water volume is referenced 14b.

It is emphasized that the ballast tank may be fitted with longitudinally extending bulkheads, so that the air enclosed in the ballast tank will not be emptied therefrom, either completely or partially, when the hull heels in rough water conditions.

The vertical dimensions of the cavity 14 can be kept low while still achieving the desired effect, and said cavity will conveniently have a vertical dimension of between 0.5 and 1.5 m, preferably 0.6–1.2 m. In the illustrated case, the cavity has a height of 0.7–0.8 m.

The pipe system 11 through which air is delivered and discharged is controlled electrically by a control and distributing device 15, which in turn is controlled by a central control unit 16.

The control and distributing device 15 is constructed to deliver a stream of air to the bottom edge 1b' of the hull part 1b through a conduit 11c, wherewith the air bubbles thus generated expand and rise upwards and "stroke" or "roll" along the hull side 1b up to the waterline A.

When the vessel makes speed and travels quickly through the water, these bubbles will move in an upward and obliquely sternward path.

The conduit 11c is connected to a number of horizontally positioned pipes 22 having openings or nozzles, of which one nozzle is referenced 19. The nozzles are positioned sequentially along the full length of the edge 1b' and on both sides of the hull.

The flow through the nozzles can be controlled by opening a valve 20 to a greater or a lesser extent, wherewith air in the cavity 14 is also able to pass out through the pipe 22 and the nozzles 19.

Air is also able to pass from the cavity 14 through a channel 21 which extends obliquely towards the stern, this air rising in the form of bubbles along the sides of the hull. This requires, however, the presence of a maximized air volume 14a in the cavity.

The invention provides various ways in which the airflows can be controlled. For instance, pressurized air can be applied to the cavity 14 and can be conducted to outside the hull 1 through one or more pipes 22 or channels 21. Each stream of air through each pipe 22 can be regulated separately via the central control unit 16, through the medium of a number of valves similar to the valve shown in the drawings.

The pipes in the pipe system shall discharge on both the port and the starboard sides. The discharge orifices or nozzles 19 of the pipe system are spaced apart horizontally along the bottom part at a mutual distance of 30 and 50 cm. This distance is preferably about 30 cm. However, the distance will depend on the type of the nozzles used and on the air flow forced therefrom. Smaller distances can accept smaller air flows per nozzle 19.

It lies within the scope of the invention to vary the horizontal distance between the discharge orifices and/or the nozzles, although the vertical distance may also be varied. In this regard, the distance between the nozzles is smaller in the bow part of the hull than in the midship parts 1b.

Channels 21 which function as air-distributing nozzles may also be arranged along the side-edge regions of the cavity 14 and adapted to discharge at the lowermost part 1b' of the two hull parts 1b, or in the immediate vicinity of said lowermost part 1b', said hull parts 1b diverging upwardly from a vertical plane "V". The waterline "A" is chosen along these hull parts 1b.

When seen in cross-section, the hull comprises along essentially the whole of its length a centred, horizontally extending bottom part 1a having two side members 1b which extend from the hull length orientated edge lines 1b' of the bottom part and diverge upwardly from a vertical plane. In this regard, reference is made to the disclosures in the aforesaid Swedish patent specification.

Figure 4:
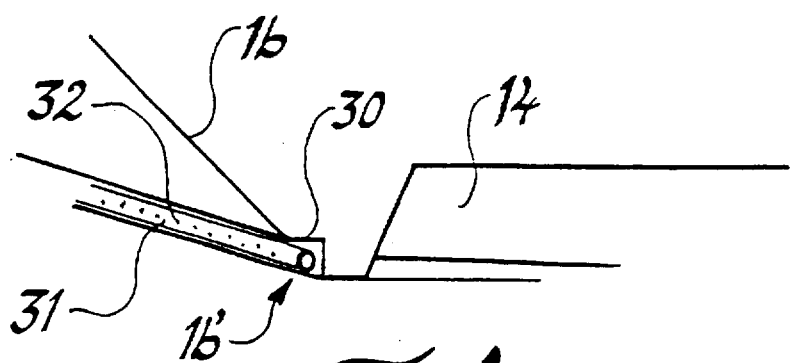
FIG. 4 is an enlarged perspective view of the same bottom part shown in FIG. 3 but provided with a longitudinally extending pipe.

FIG. 4 illustrates an embodiment in which the lowermost part 1b' of the side members 1b is provided with a recess 30 in which there is mounted a pipe 31 which includes a number of small holes, of which one hole is referenced 32, said pipe being connected to the pipe system 11 by means of a conduit 11d.

The pipe 31 and an opposing pipe 31' extend from the forward part of the hull to the sternward part thereof and the holes in the pipe are positioned and configured to generate small air bubbles. The spacing between the holes is from 1–5 cm.

It also lies within the scope of the invention to position a pipe, similar to the pipe 31, across the hull adjacent to and preferably sternwards of the engine room, or to provide channels similar to the channels 21, or to position pipes similar to the pipes 22 in the sternward surface 14c of the cavity 14, wherein air bubbles will "roll" along the lowermost surface of the hull towards the stern of the vessel as the hull makes speed through the water, whereby a region sternwards of the region 20 will also be supported by air bubbles.

The aforedescribed arrangement, or system, provides a combination of ballast tank and friction-reducing means with regard to the bottom flat surface, and a friction-reducing means with regard to upwardly divergent side surfaces, even when the hull heels steeply in heavy seas and rough swells.

The invention is not restricted to the aforedescribed and illustrated exemplifying embodiment thereof, since modifications and changes can be made within the scope of the inventive concept as defined in the following Claims.

It should be noted that each bubble of air that rises along the upwardly diverging side of the hull presses against the hull, thereby contributing to the overall force of lift. These air bubbles increase in volume as they rise, and deviate, due to the contact with the side of the hull, from a sphere-like shape. Instead, they are very thin and their contact surface is spread wide against the surface of the hull.

I claim:

1. A hull for a vessel, comprising:

a cargo deck adapted to carry a plurality of barges, the cargo deck having wall members along starboard and port sides and a centrally located wall member, the cargo deck being open toward a stern of the vessel;

a hull, the hull including an outer surface, the outer surface including one or more side surfaces and a bottom surface, and an interior;

at least one ballast tank disposed in the interior of the hull;

means, disposed in the interior of the hull, for emptying and filling the ballast tanks with water such that a draft of the hull is decreased and increased by emptying and filling the ballast tanks with water, and wherein, when the ballast tanks are filled, the cargo deck is located sufficiently far beneath a waterline that fully loaded barges are adapted to float above the cargo deck, and, when the ballast tanks are empty, the cargo deck is located at a sufficiently high level that at least part of a weight of the barges rests on the cargo deck;

an air-compressing device;

a pipe system for delivering an air flow from the air-compressing device to orifices in the outer surface of the hull below the waterline;

the outer surface of the hull including a lowermost surface region, at least a part of the lowermost surface region of the hull being flat and extending horizontally, the lowermost surface region having a cavity, at least some of the orifices being disposed to deliver the air flow from the air-compressing device delivered by the pipe system to the orifices at least into the cavity; and the outer surface of the hull having upwardly divergent hull surface regions provided adjacent the lowermost surface region, at least some of the orifices being disposed on both starboard and port sides of lower regions of the upwardly divergent hull surface regions such that air bubbles generated by the air flow from the air-compressing device delivered by the pipe system to the orifices are caused to rise divergently along the upwardly divergent hull surface regions to contribute a lifting force against the upwardly divergent hull surface regions and reduce friction against the upwardly divergent hull surface regions.

2. The hull for a vessel as set forth in claim 1, wherein the hull includes a plurality of channels extending from the cavity to the upwardly divergent hull surface regions to permit air flow from the cavity to the upwardly divergent hull surface regions.

3. The hull for a vessel as set forth in claim 2, wherein the hull includes a plurality of channels extending from the cavity to a flat part of the lowermost surface region.

4. The hull for a vessel as set forth in claim 1, wherein the hull includes a plurality of channels extending from the cavity to a flat part of the lowermost surface region.

* * * * *